United States Patent [19]

Barber

[11] 4,163,567

[45] Aug. 7, 1979

[54] VEHICLE, ESPECIALLY AMUSEMENT VEHICLE

[76] Inventor: Gerald L. Barber, 1209 Edwards Rd., Greenville, S.C. 29615

[21] Appl. No.: 775,889

[22] Filed: Mar. 9, 1977

[51] Int. Cl.² .............................................. A63G 29/02
[52] U.S. Cl. ..................................... 280/208; 180/6.5; 180/74
[58] Field of Search ....................... 280/206, 207, 208; 180/10, 21, 6.48, 6.5, 74

[56] References Cited

U.S. PATENT DOCUMENTS

| | | | |
|---|---|---|---|
| 228,908 | 6/1880 | Langmaak et al. | 280/207 |
| 521,786 | 6/1894 | Finch | 280/207 |
| 2,001,205 | 5/1935 | Marten | 280/207 |
| 2,954,836 | 10/1960 | Cavanaugh | 180/74 |
| 3,161,248 | 12/1964 | Edwards | 180/10 |
| 3,193,038 | 7/1965 | Cronkright | 180/10 |
| 3,260,324 | 7/1966 | Suarez | 280/206 X |
| 3,386,753 | 6/1968 | Quedreux | 280/208 |
| 3,893,707 | 7/1975 | Samsel | 280/208 |

*Primary Examiner*—Joseph F. Peters, Jr.
*Assistant Examiner*—Michael Mar
*Attorney, Agent, or Firm*—Albert L. Jeffers; John F. Hoffman

[57] ABSTRACT

A vehicle, especially an amusement vehicle, in which a frame having seating means for receiving at least one occupant is located within the radial confines of a pair of relatively large coaxial spaced wheels. The frame includes rollers mounted thereon, distributed circumferentially about the insides of the larger wheels, and rollingly engaging the wheels. At least one of the rollers for each wheel is driven in rotation by a mechanism under the control of the vehicle occupant for propelling the vehicle. The center of gravity of the frame, including any occupant therein, is below the common axis of the wheels so that actuation of the drive rollers in rotation will cause the frame first to move within the wheels to create an unbalanced condition in the vehicle. The wheels will then commence rotation and the vehicle will move. The wheels can be driven at respective speeds for steering purposes.

16 Claims, 10 Drawing Figures

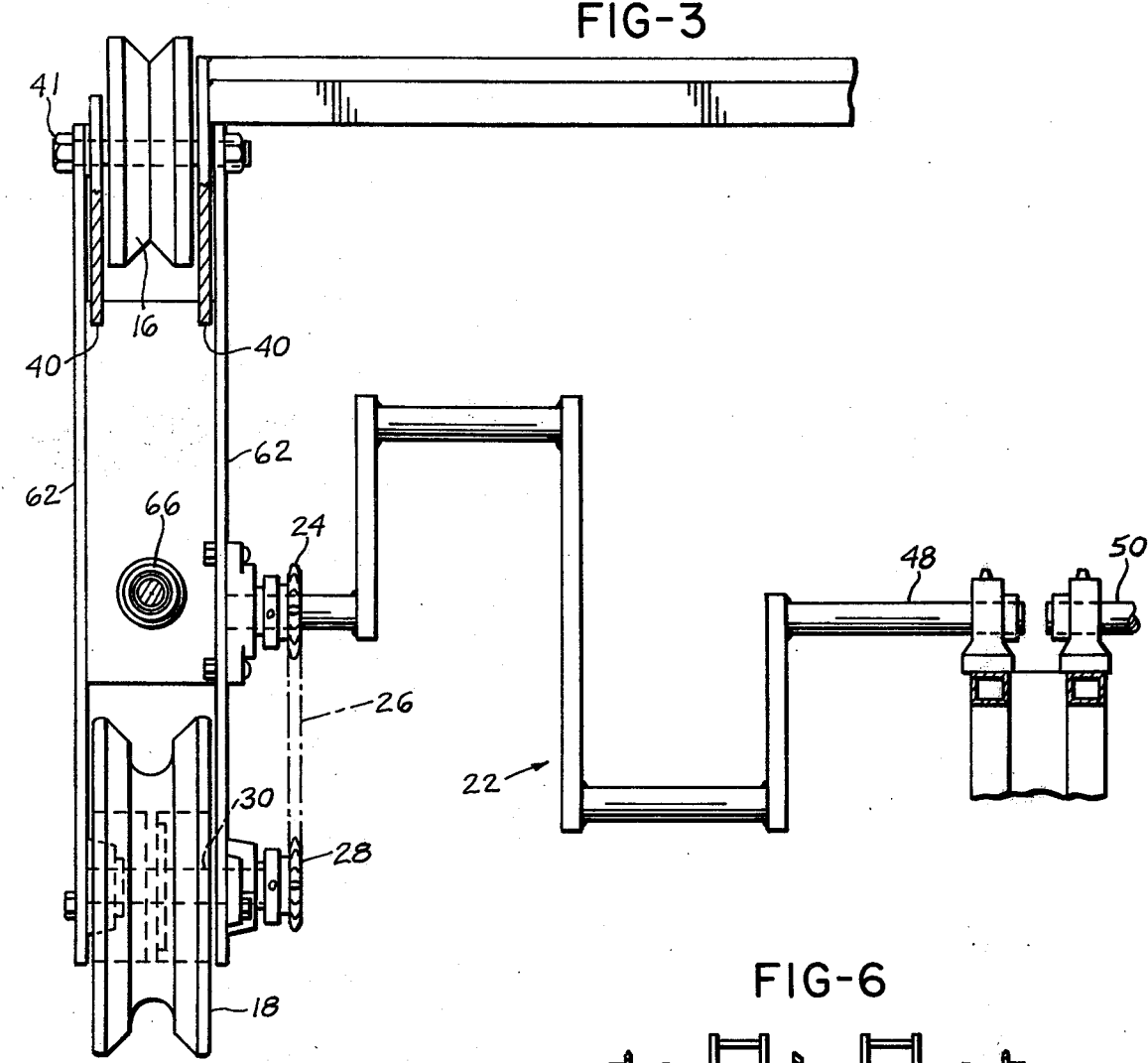

VEHICLE, ESPECIALLY AMUSEMENT VEHICLE

The present invention is concerned with a wheeled vehicle, particularly a two-wheeled amusement vehicle, and more particularly still to a vehicle in which a frame for receiving at least one occupant is located within the radial limits of a pair of coaxial spaced wheels.

Vehicles of the general nature with which the present invention is concerned have been known but heretofore have had certain defects in respect of the cost of manufacture and maneuverability and the like.

The present invention has as a primary object the provision of a two-wheeled vehicle of the nature referred to in which problems that have been encountered in connection with similar vehicles according to the prior art have been eliminated and in which the vehicle can be constructed relatively simply and at relatively low cost.

BRIEF SUMMARY OF THE INVENTION

According to the present invention, a pair of rather large wheels are provided in coaxial spaced relation with a frame between the wheels and having rollers distributed thereabout rollingly engaging each wheel. The frame includes means for seating at least one occupant and the center of gravity of the frame, either with or without an occupant, is below the common axis of the wheels so that the frame occupies a preferred rest position within the wheels favorable to receiving an occupant.

The location of the center of gravity of the frame below the common axis of the wheels also provides the basis for driving the wheels because at least one of the rollers on the frame for each wheel is adapted for being driven in rotation under the control of the vehicle occupant, or occupants, and the driving of these drive rollers will cause the frame to shift about the common axis of the wheels, thereby disturbing the balance of the wheels and frame and causing the wheels to rotate to return the assembly to the condition of balance and, thereby, move the vehicle.

In one modification, the occupant, or occupants, peddle a crank shaft which is connected to the drive rollers for the wheels with an occupant controlled mechanism for varying the speed of one wheel relative to the other so that the vehicle can be driven in a straight line or turned to either side.

In other proposed modifications, an engine can drive the wheels with occupant controlled steering to control the relative speeds of the wheels, or an electric motor can be employed for driving the wheels. The last mentioned arrangement for driving the wheels utilizing an electric motor can be employed, for example, in an amusement area, or the like, wherein the surface on which the vehicle runs is perfectly smooth, thus requiring the smallest amount of power for driving the vehicle.

The wheels referred to may be solid rubber wheels of a suitable durometer or, advantageously, pneumatic tires of a known type and size can be mounted on the wheels. The wheels include an annular surface, advantageously on the radially inner side, adapted for engagement with the rollers of the frame. The inner side of each wheel, for example, may take the form of a channel in which the pertaining rollers fit, or it may be in the form of a channel having a V-shape in the center with the apex facing inwardly and with the V-shaped portion engaging at least the drive roller which actuates the respective wheel.

The drive rollers may be of molded plastic material or may be of any other material, such as die cast metal, with a rubber-like tire being applied to either wheel, if necessary, for friction enhancing purposes. In some cases, the entire roller can be formed of plastic material, especially, if the plastic material is of a resilient nature so as to provide good frictional engagement of at least the drive roller with the inside of the wheels.

The exact nature of the present invention will be more clearly comprehended upon reference to the following detailed specification taken in connection with the accompanying drawings in which:

FIG. 3 is a sectional view indicated by line III—III on FIG. 2.

FIG. 4 is a sectional view indicated by line IV—IV on FIG. 2.

FIG. 5 is a fragmentary sectional view of a wheel having a pneumatic tire and also showing a modified form for the drive track of the wheel and the drive roller for the wheel.

FIG. 6 is a schematic view of a modification showing a differential in the drive train.

DETAILED DESCRIPTION OF THE INVENTION

Figure 1:
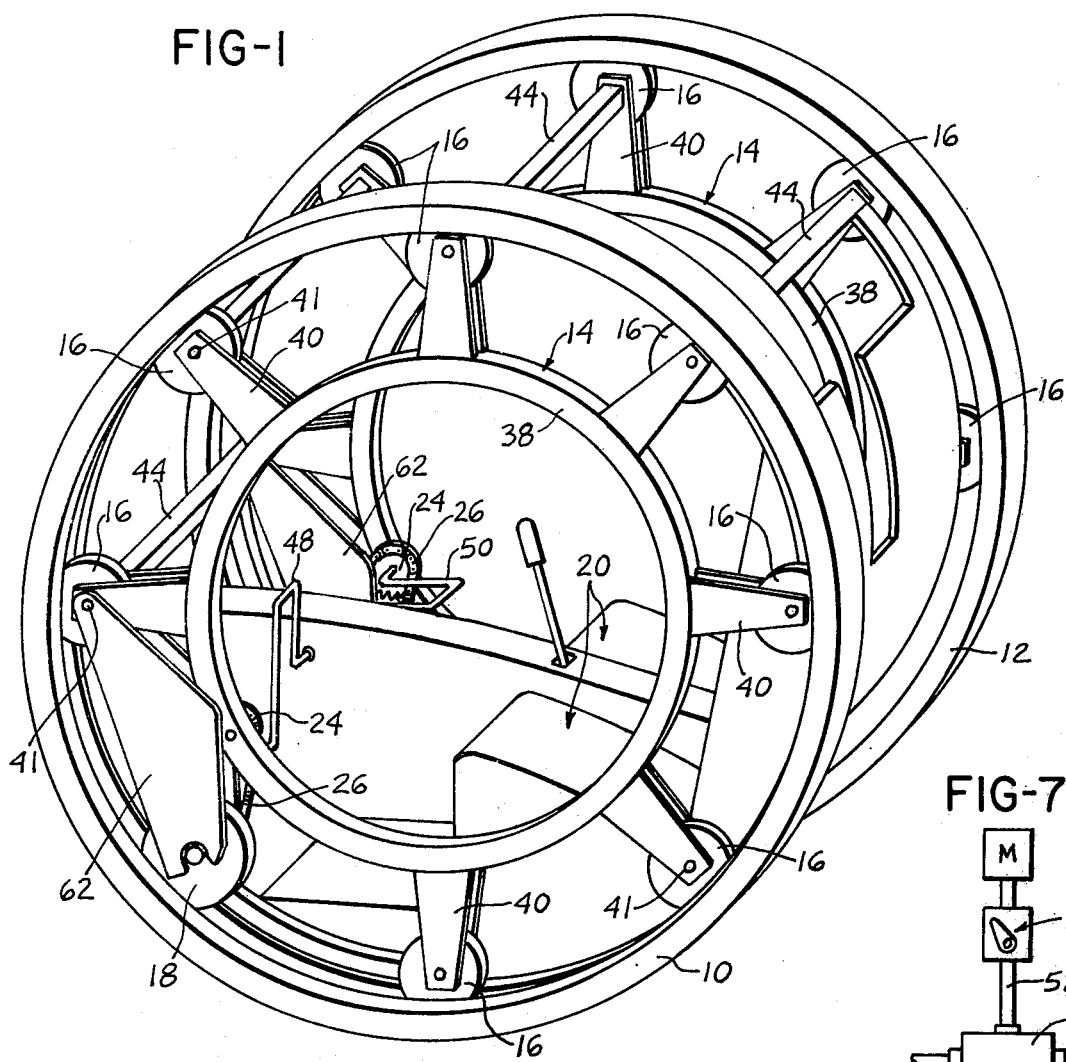
FIG. 1 is a somewhat schematic perspective view of a vehicle according to the present invention.
Figure 2:
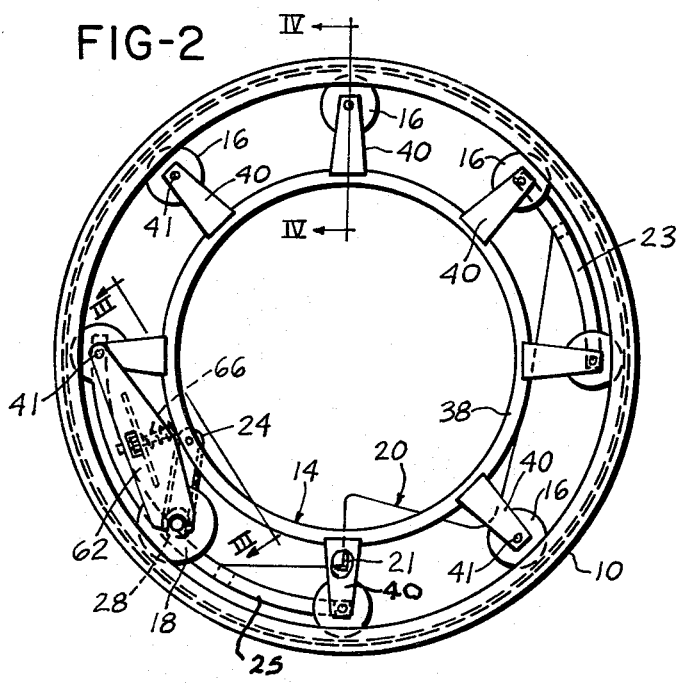
FIG. 2 is an end view of the vehicle with the rear wheel removed.

The vehicle according to the present invention, as will be seen in FIGS. 1 and 2, comprises spaced coaxial wheels 10 and 12 within which there is rotatably supported a generally circular frame 14 having peripherally spaced rollers 16 which rollingly engage the radially inner sides of wheels 10 and 12 and support the frame therein.

Each side of frame 14 rotatably supports a drive roller 18 which, when rotated, will cause relative rotation between the frame and the wheels. The frame includes therein a seating arrangement generally indicated at 20 for seating one or more occupants of the vehicle.

In the modification shown in FIGS. 1 and 2, the seating arrangement 20 is provided with a crankshaft 22 extending transversely thereof which can be actuated by the feet of the occupant, or occupants, of the vehicle.

Crankshaft 22 (see FIG. 3) supports small sprockets 24, of which only one will be seen in FIG. 3, which are connected by chains 26 with sprockets 28, each mounted on a respective shaft 30 with each shaft 30 carrying a drive roller 18.

Each of the wheels 10 and 12 (see FIG. 4) has a radially inwardly opening channel portion 32 into which the rollers 16, and the drive roller 18 at the respective end of frame 14, extend. Channel 32 may have a V-shaped central rib 34 extending thereabout and projecting radially inwardly therefrom for engagement with complementarily shaped peripheral grooves formed in rollers 16 and the respective drive roller 18.

The radially outer side of each wheel is provided with a tire 36 which may be solid rubber of a suitable durometer, to impart a desired degree of resilience to the wheel, or the tire may be a pneumatic tire of a suitable size.

FIG. 4 is a section through a wheel showing a solid tire 36 thereon with the V-shaped member 34 mounted in the radially inwardly facing channel portion of the wheel while FIG. 5 shows a wheel provided with a pneumatic tire 36A and with the V-shaped member absent from the radially inwardly opening channel.

In the case of the last mentioned figure, at least the drive roller 18 is provided with a friction enhancing coating 19, as shown, in order to compensate for the loss of surface area which comes about by leaving the V-shaped element 34 out of the radially inwardly opening channel portion of the wheel.

The frame 14 referred to above is preferably formed of at least one pair of tubular members consisting of rings 38 made up from a tubular member and pairs of bracket means 40 welded to the rings 38 and projecting radially outwardly therefrom. Rollers 16 are rotatably mounted on bracket means 40 by pivot bolts 41 and bearings 42 (FIG. 4). Structural elements 44, in the form of tubing, extend between corresponding inner ones of bracket means 40 pertaining to the respective wheels and have the ends welded to the bracket means 40 together with reinforcing gusset means 45. The frame is thus made substantially rigid and strong while still being of light weight.

The seating means 20, previously referred to, may rest on an angle 21 extending between and connected to bracket means 40 at opposite ends of the frame 14 and also has arcuate support brackets 23 and 25 at the upper and lower ends extending between and connected to adjacent ones of structural members 44. The seating means is thus fixed to and supported by the frame 14.

Guiding of the vehicle can be effected by driving wheels 10 and 12 at different speeds, and this can be accomplished by causing the shafts 30 to turn at respective speeds which, in turn, in the modification referred to, can be effected by dividing the crankshaft in the center into end portions 48 and 50 with each having two throws thereon. Each end portion of the crankshaft is operated by a respective occupant of the vehicle.

The vehicle can also be steered in a different manner as shown schematically in FIG. 6 in which the crankshaft operated by the vehicle occupant, or occupants, is not divided into a portion for each occupant and drives a shaft 52 which forms the input to a three element differential 54, the other two elements of which are in the form of shafts 55 and 57 drivingly connected to the shafts 30 for the drive rollers.

Respective brake drums 56 are provided for the last mentioned elements 55 and 57 of the differential and brake shoes 58 are mounted adjacent thereto. An actuating lever 60, normally centered by springs 61, is connected to the brake shoes and is occupant activated manually for effecting selective engagement of the shoes with the respective drums thereby to selectively slow down one wheel while increasing the speed of the other, and in this manner, steering of the vehicle can readily be effected. The lever 60 can be moved bodily against the bias of a spring 68 to move both brake shoes 58 against the driver 56 to obtain a degree of vehicle braking.

The aforementioned drive rollers 18 are rotatably mounted on respective support arms, or plate means, 62 which are pivotally supported in frame 14 on an adjacent one of bolts 41 (FIGS. 2 and 3).

A spring 66 acts on each plate means 62 in a direction to press the respective drive roller against the inside of the pertaining wheel thereby insuring good frictional engagement of the drive rollers with the wheels.

Where the crankshaft means comprises respective end portions, the inner end of each crankshaft portion is preferably journalled in a self-aligning bearing so that the outer end of the respective crankshaft portion can readily be moved together with the respective plate means 62 in the radial direction of the vehicle wheels. Where the crankshaft is not so divided into end portions, bearings at the center of the crankshaft can be eliminated and the plate means 62 can provide the entire support for the crankshaft.

All of the rollers can be in the form of plastic moldings, including the drive rollers, although the latter can also be formed of a slightly elastic material to enhance the frictional engagement thereof with the wheels.

Further, as mentioned, the drive rollers can be formed of molded plastic material and be covered by a resilient tire element or the like to improve the frictional engagement of the drive rollers with the wheels.

Figure 7:
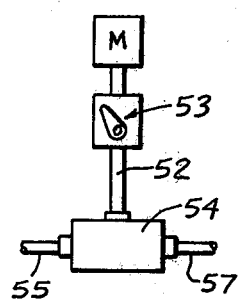
FIG. 7 shows a power drive for the vehicle.

FIG. 7 shows an engine or an electric motor M connected for driving the input element 52 of the three element differential 54, via a speed reduction transmission 53 and which could be variable, for actuation of the vehicle. The same steering arrangement referred to above is utilized for steering the vehicle when a power source, such as an engine or an electric motor, is employed for driving the vehicle.

A further possibility for driving the vehicle, especially where the vehicle is in the form of an amusement device and runs on a smooth surface, is the provision of an electric motor for each wheel. A suitable speed reducing or variable speed transmission could be interposed between each motor and the respective drive roller shaft. Differential speed of the wheels can be obtained by varying the speeds of the motors relatively or by adjusting the variable speed transmissions.

Figure 8:
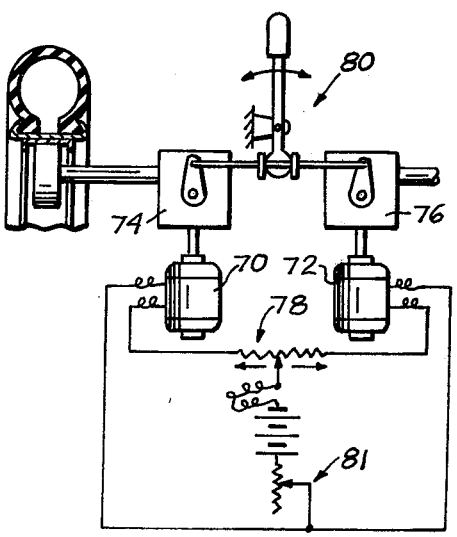
FIG. 8 shows a drive arrangement utilizing an electric motor for each wheel.

FIG. 8 is a schematic view of the above described arrangement. The respective electric motors are indicated at 70 and 72 with the respective transmissions driven thereby at 74 and 76.

For steering purposes, a resistor arrangement at 78 can be employed to cause the speeds of the motors to differ or a control can be supplied to vary the respective output speeds of the transmissions.

A speed control can be provided in the form of rheostat, or adjustable resistor 81.

Figure 9:
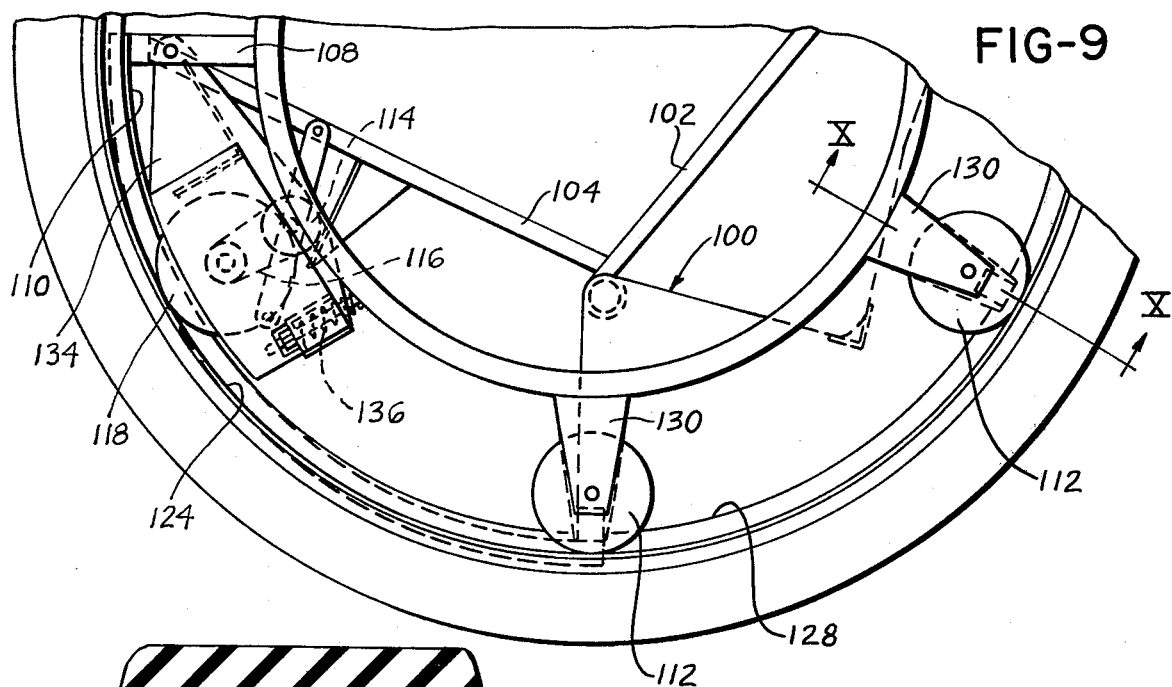
FIG. 9 is a fragmentary view showing a modification.
Figure 10:
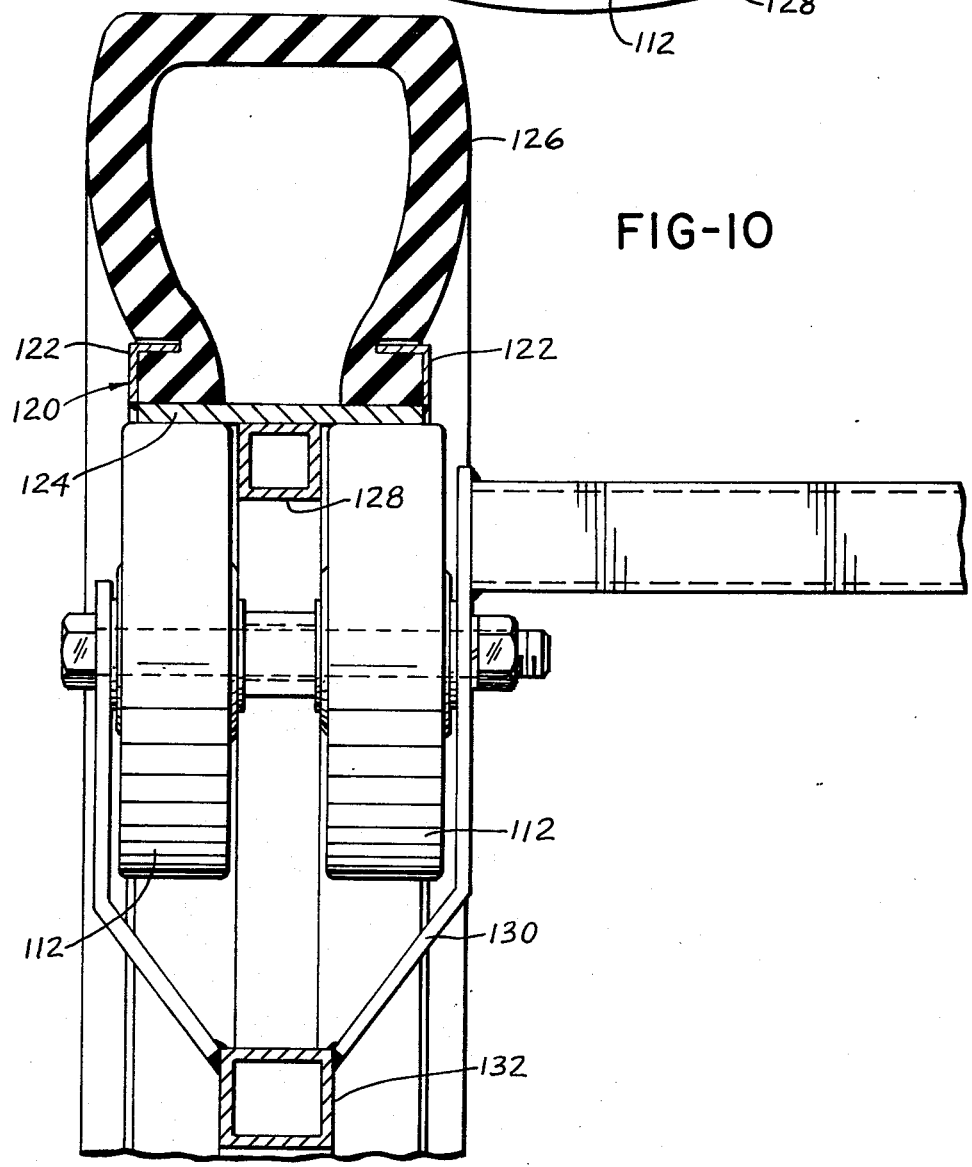
FIG. 10 is a section indicated by line X—X on FIG. 9.

The modification of FIGS. 9 and 10 is quite similar to what has been described above but embodies certain advantageous changes.

In FIGS. 9 and 10, the seat 100 will be seen to be nested within the frame with an upwardly extending side rail 102 and a generally fore and aft extending further side rail 104. The rails have their adjacent ends interconnected in the region of the forward end of the seat while the outer end of rail 102 is connected to a roller support flange 106 while the outer end of rail 104 is connected to a structural member 108 which, in turn, is secured to an arcuate rail member 110 forming a part of the seat structure and extending around the inside of the vehicle frame for about 270 degrees.

In practice, the seat structure can be constructed within a pair of spaced arcuate rails 110 and thereafter assembled in the structure by connection of the aforesaid rail to the portion of the frame carrying the rollers 112 on which the larger outer wheels are rollingly supported.

The drive mechanism, as in connection with the previous modification, includes crankshaft driven sprocket means 114 each connected by a chain 116 to a sprocket on the axis of a respective drive wheel 118 which engages the inside of the main rotatable supporting wheel of the vehicle.

As will be seen in FIG. 10, the main supporting wheels of the vehicle, one of which is indicated at 120 in FIG. 10, are formed by connecting angles 122 to a plate 124 so as to form a clincher arrangement for receiving the bead region of a pneumatic tire 126. The plate 124 and the angles 122 are, of course, circular.

In the modification of FIG. 10, a square rail element 128 is welded to the inside of plate 124 and reinforces the wheel and holds it in its circular configuration.

The rollers 112 previously referred to will be seen to comprise a pair of rollers in each supporting region about the inside of the wheel with the rollers 112 supported in a yoke arrangement 130 which, at its radially inner end, is fixed, as by welding, to the circular member 132 with forming a part of the frame at each end or side of the vehicle.

It will be seen in FIG. 9 that each drive roller 118, and which engages the inside of plate 124 on each side of reinforcing central rail 128, is rotatable in a respective frame 134 pivoted at one end on the respective structural member 108 and at the other end biased by a compression spring 136 in a direction to press the respective drive wheel against the inner surface of the pertaining main wheel of the vehicle.

Modifications may be made within the scope of the appended claims.

What is claimed is:

1. A vehicle comprising: a pair of coaxial spaced wheels having inwardly facing annular surfaces thereon, a frame within the radial confines of said wheels extending axially between the wheels, roller means rotatable on respective horizontal axes on the frame and distributed circumferentially on the frame in the plane of and supportingly engaging each said annular surface for rotatably supporting the frame on said wheels, seat means in the frame for seating at least one occupant, the center of gravity of said frame including any occupants seated therein being substantially lower than the common axis of said wheels, means carried by the frame and under the control of the vehicle occupant for driving at least one roller pertaining to each wheel for propelling the vehicle, a member having a pivotal connection with said frame and rotatably supporting a said drive roller at a point spaced from the pivotal connection, and spring means acting between said frame and said member for urging said member in a direction to press the drive roller thereon toward the respective wheel.

2. A vehicle according to claim 1 which includes means for varying the speed of one wheel relative to the other for steering purposes.

3. A vehicle according to claim 1 in which said drive means includes occupant-actuated crank means for driving connected to said rollers.

4. A vehicle according to claim 3 in which said occupant actuated crank means comprises a crank connected to each drive roller and adapted for actuation by a respective occupant of the vehicle.

5. A vehicle according to claim 3 wherein said means for driving comprises a differential operatively connected between said crank means and said drive rollers.

6. A vehicle according to claim 1 in which said means for driving includes occupant controlled power means connected to said drive rollers.

7. A vehicle according to claim 1 in which said frame comprises spaced coaxial ring members and structural elements extending axially between and operatively fixed to said ring members.

8. A vehicle according to claim 1 in which each wheel includes inwardly opening channels into which said rollers extend.

9. A vehicle according to claim 8 in which each channel has a V-shaped member fixed therein and extending circumferentially therein, at least the drive rollers being grooved to receive the V-shaped member of the respective wheel.

10. A vehicle according to claim 1 in which said frame comprises spaced coaxial ring members, bracket means fixed to each said ring member in circumferentially spaced relation and each bracket means comprising a pair of axially spaced bracket elements adapted to receive a respective said roller therebetween, and axial structural elements extending between and fixed to corresponding inner bracket elements on respective ends of the frame.

11. A vehicle according to claim 1 in which each said wheel comprises a strip of metal formed to a cylindrical element, angle elements secured to the outer surface of said cylindrical element in facing relation to form spaced grooves for receiving the bead portion of a tire, and a reinforcing rail member extending about said cylindrical element.

12. A vehicle according to claim 11 in which said rail member is rectangular.

13. A vehicle according to claim 11 in which said roller means engage said cylindrical element on the inwardly facing side on each lateral side of said reinforcing rail member.

14. A vehicle according to claim 1 in which said frame comprises spaced coaxial ring members, outwardly extending bracket means fixed to each said ring member in circumferentially spaced relation and each bracket means defining a yoke for receiving a said roller means, each said wheel means comprising a cylindrical element having an inner surface engaged by said roller means, a reinforcing rail extending circumferentially about the inside of each wheel and fixed to said cylindrical element in the space between said roller means, and means on the outer side of each cylindrical element for engaging a pneumatic tire mounted on the respective wheel.

15. A vehicle comprising: a pair of coaxial spaced wheels having inwardly facing annular surfaces thereon, a frame within the radial confines of said wheels extending axially between the wheels, roller means rotatable on respective horizontal axes and distributed circumferentially on the frame in the plane of and supportingly engaging each said annular surface for rotatably supporting the frame on said wheels, seat means in the frame for seating at least one occupant, the center of gravity of said frame including any occupant seated therein being substantially lower than the common axis of said wheels, means carried by the frame and under the control of the vehicle occupant for driving at least one roller pertaining to each wheel for propelling the vehicle, said drive means comprising a differential connected between a source of driving force and said rollers, occupant controlled friction brake means for selectively retarding the rotation of one of said rollers so as to steer the vehicle, and means for spring biasing the driving roller for each wheel radially outwardly into firm driving engagement with the respective wheel.

16. A vehicle comprising: a pair of coaxial spaced wheels having inwardly facing annular surfaces thereon, a frame within the radial confines of said wheels extending axially between the wheels, roller means rotatable on respective horizontal axes and distributed circumferentially on the frame in the plane of and supportingly engaging each said annular surface for rotatably supporting the frame on said wheels, seat means in the frame for seating at least one occupant, the center of gravity of said frame including any occupants seated therein being substantially lower than the common axis of said wheels, means carried by the frame and under the control of the vehicle occupant for driving at least one roller pertaining to each wheel for propelling the vehicle, and means for spring biasing the driving roller for each wheel radially outwardly into firm driving engagement with the respective wheel, said means for driving comprises a pair of electric motors driving respective said driving rollers, and steering means for adjusting the relative speeds at which said motors rotate.

* * * * *

UNITED STATES PATENT AND TRADEMARK OFFICE
CERTIFICATE OF CORRECTION

PATENT NO. : 4,163,567
DATED : August 7, 1979
INVENTOR(S) : Gerald L. Barber

It is certified that error appears in the above-identified patent and that said Letters Patent are hereby corrected as shown below:

Claim 3, Col. 5, lines 62 and 63 "drive" should be deleted in line 1 of claim, and "for driving" should appear after first "means" in line 2 of claim.

Claim 3, Col. 5, lines 63 and 64, "for driving" should be deleted.

Signed and Sealed this

Eighteenth Day of March 1980

[SEAL]

Attest:

SIDNEY A. DIAMOND

Attesting Officer

Commissioner of Patents and Trademarks